United States Patent
Faschang

(10) Patent No.: US 9,906,163 B2
(45) Date of Patent: Feb. 27, 2018

(54) DEVICE AND METHOD FOR SAFE CONTROL OF A SEMICONDUCTOR SWITCH OF AN INVERTER

(71) Applicant: B&R INDUSTRIAL AUTOMATION GMBH, Eggelsberg (AT)

(72) Inventor: Leopold Faschang, Eggelsberg (AT)

(73) Assignee: B&R Industrial Automation GmbH, Eggelsberg (AT)

( * ) Notice: Subject to any disclaimer, the term of this patent is extended or adjusted under 35 U.S.C. 154(b) by 0 days.

(21) Appl. No.: 14/947,000

(22) Filed: Nov. 20, 2015

(65) Prior Publication Data

US 2016/0149514 A1    May 26, 2016

(30) Foreign Application Priority Data

Nov. 21, 2014    (AT) .............................. A 50846/2014

(51) Int. Cl.
| | |
|---|---|
| *H02M 1/32* | (2007.01) |
| *H02M 7/537* | (2006.01) |
| *H02M 1/08* | (2006.01) |
| H02P 27/06 | (2006.01) |

(52) U.S. Cl.
CPC ............. *H02M 7/537* (2013.01); *H02M 1/08* (2013.01); *H02M 1/32* (2013.01); *H02P 27/06* (2013.01)

(58) Field of Classification Search
CPC ........ H02M 1/32; H02M 1/4208; H02M 3/10; H02M 3/33507; H02M 3/315; H02M 3/335; H02M 3/3155; H02M 7/515; H02M 7/48; H02M 7/53871; G05F 1/30; H02H 7/122

USPC ............ 363/55, 56.01, 78, 95, 97, 123, 133
See application file for complete search history.

(56) References Cited

U.S. PATENT DOCUMENTS

| | | | |
|---|---|---|---|
| 5,485,341 A | 8/1996 | Okado et al. | |
| 5,966,001 A * | 10/1999 | Maehara | H02J 7/1446 322/18 |
| 6,072,302 A * | 6/2000 | Underwood | H02J 3/38 322/17 |
| 6,127,788 A * | 10/2000 | Yamamoto | H02H 11/003 315/209 R |
| 6,680,630 B1 | 1/2004 | Hiyama | |
| 8,421,387 B2 | 4/2013 | Krause et al. | |

(Continued)

FOREIGN PATENT DOCUMENTS

| | | |
|---|---|---|
| DE | 693 10 679 | 9/1997 |
| DE | 103 17 374 | 2/2004 |

(Continued)

OTHER PUBLICATIONS

Austrian Search Report conducted in counterpart Austrian Appln. No. A 50846/2014 (dated Nov. 13, 2015).

*Primary Examiner* — Adolf Berhane
(74) *Attorney, Agent, or Firm* — Greenblum & Bernstein, P.L.C.

(57) ABSTRACT

A device for safe control of at least one driver module for controlling a semiconductor switch of an inverter, wherein the driver module controls the semiconductor switch in dependence on a pulse signal, wherein a switching arrangement which is connected with the driver module is provided and that this has a switching connection for applying an inhibition signal and a first connection for applying the pulse signal, in order to either inhibit or switch the pulse signal applied to the first connection through to the driver module, depending on the inhibition signal.

13 Claims, 3 Drawing Sheets

(56) References Cited

U.S. PATENT DOCUMENTS

| | | | |
|---|---|---|---|
| 8,436,570 B2* | 5/2013 | Ando | G05B 19/4063 |
| | | | 318/490 |
| 2008/0174184 A1* | 7/2008 | Arpilliere | H02M 1/08 |
| | | | 307/125 |
| 2014/0111128 A1 | 4/2014 | Hensel et al. | |
| 2016/0118891 A1 | 4/2016 | Hashimoto et al. | |
| 2016/0164402 A1* | 6/2016 | Hargis | H02M 7/5387 |
| | | | 327/536 |

FOREIGN PATENT DOCUMENTS

| | | |
|---|---|---|
| DE | 10 2008 027 113 | 12/2009 |
| DE | 11 2013 006 912 | 12/2015 |
| EP | 2 372 478 | 10/2011 |
| EP | 2 495 869 | 11/2013 |
| EP | 2 725 435 | 4/2014 |
| WO | 2014/181450 | 11/2014 |

\* cited by examiner

DEVICE AND METHOD FOR SAFE CONTROL OF A SEMICONDUCTOR SWITCH OF AN INVERTER

CROSS-REFERENCE TO RELATED APPLICATIONS

The present application claims priority under 35 U.S.C. § 119(a) of Austria Patent Application No. A50846/2014 filed Nov. 21, 2014, the disclosure of which is expressly incorporated by reference herein in its entirety.

BACKGROUND OF THE INVENTION

1. Field of the Embodiments

The present invention relates to a device and a method for safe control of at least one driver module for controlling a semiconductor switch of an inverter, wherein the driver module controls the semiconductor switch in dependence on a pulse signal.

2. Discussion of Background Information

A wide variety of safety functions are used in connection with electric drives, the object of which safety functions is to reduce the risk for both man and the machine itself.

Safe pulse inhibition counts among the most common and most basic safety functions associated with electric drives. In general, safe pulse inhibition is designated as a "Safe Torque Off function" or "STO function," for which reason only the designation STO function will be used hereinafter in this context.

The object of an STO function is that the electric drive is switched without torque. The aim is that the electric drive does not continue to receive current, which may lead to a rotational movement. The STO function thus ensures that no torque-forming current can continue to act on the electric drive, and that a continuous rotational movement or an undesired start-up is prevented. Of course, this also applies in an analogous manner for driving linear motors and the linear movement thereof.

In this context, the STO function is used widely, for example in production and handling equipment.

As the monitoring of the standstill position does not take place through the typical STO function itself, the STO function is typically used in applications where the drive itself comes to a standstill in a sufficiently short time through the load torque or friction, or where the turning off of the drive does not have relevance in terms of safety. If no appropriate brake systems are otherwise provided for risk mitigation, the electric drive runs down unbraked after activation of the STO function.

EP 2 495 869 A2, for example, shows a controller for an electric drive with an STO function. A production unit produces a supply voltage for the driver of the circuit breaker depending on the operating state. For controlling, these drivers are supplied with pulse width modulated (PWM) pulse signals. If the STO function is activated, for example due to an interrupted safety switch, the voltage supply to the driver is interrupted or is no longer provided. A safe torque off state is thereby effected, as no further control signals are sent or transmitted from the driver.

A disadvantage can be seen here that the driver has a high and strongly fluctuating power consumption and must therefore be supported with large energy stores in the form of capacitors for the bridging of test gaps. These influence the response time in a negative way and thus lead to a delayed inhibition of the inverter, which is controlled by the drivers. Due to this delay, there results a delayed action of the STO function and thus to a reduction in safety, as the electric drive is switched with a delayed freedom from torque. Similar problems may occur not only in electric drives, but in principle anywhere where an inverter is controlled by drivers.

SUMMARY OF THE EMBODIMENTS

Embodiments of the present invention shorten reaction time and thus enhance safety with respect to the current state of the art.

Embodiments of the present invention are directed to an upstream switching arrangement that is connected with the driver module and has a switching connection for applying an inhibition signal and a first connection for applying the pulse signal, in order to either inhibit or switch the pulse signal applied to the first connection through to the driver module, depending on the inhibition signal. In this way, the power supply of a driver for the transmission of pulse signals is not interrupted, but rather the pulse signal itself is inhibited. The necessary energy stores or capacitors can be dimensioned smaller than in the case of interruption of the driver power supply, as only very little energy is needed for the transmission of the pulse signal and thus the proportion of energy to be stored is lower. The interruption of the pulse signal thus results in smaller time delays and to a substantially faster triggering of the safety function than in switches according to the prior art.

An advantageous embodiment provides that the switching arrangement is formed by a series switch of a switching element with the switching connection, an upstream high-impedance series resistor with the first connection and a downstream low-impedance load resistor, a second connection of the high-impedance series resistor is connected with an input connection of the switching element and an output connection of the switching element is connected with the low-impedance load resistor.

A further advantageous embodiment provides that the switching element is designed as a transistor in a common collector and that the input connection is formed as the base thereof, the switching connection is formed as the collector thereof and the output connection is formed as the emitter thereof. In a known manner, a transistor is a contactless switch. Transistors have short switching times, are maintenance-free, space-saving and have a long service life.

A further advantageous embodiment provides that a ballast circuit is switched ahead the switching element, the ballast circuit includes a storage capacitor with a charging apparatus and a discharging device. The charging apparatus is connected with the storage capacitor and the storage capacitor is connected with the discharging device and the switching connection of the switching arrangement. The storage capacitor makes it possible to bridge test gaps in the pulse inhibition signal, which may occur in self-testing of upstream/connected circuits, and to prevent activation of the STO function and thus the introduction of pulse inhibition.

Further, it is advantageously provided that the charging apparatus consists of at least one transfer capacitor. This ensures that only AC voltage may pass the charging apparatus.

Advantageously, it is provided that the ballast circuit includes a dynamized optical coupling for converting the inhibition signal to an AC voltage, which is connected to the charging apparatus for transmitting the AC voltage. This ensures that a failure in the galvanic isolation/optical coupling of the inhibition signal cannot be transferred by the subsequent charging apparatus.

A further advantageous embodiment provides that the optical coupling includes a feedback loop which is formed at least from a hysteresis comparator and a second optocoupler. The optical coupling may thereby be made dynamic in a simple manner.

Advantageously, it is provided that the discharging device is connected with the switching element for supplying the switching element with current. In the case of triggering of the safety function, the storage capacitor is discharged not only through current emission to the switching element, but also via the discharging device. In that the switching element is provided with current from the discharge unit, a time delay is minimized and a substantially faster triggering of the safety function is enabled.

Advantageously, it is provided that the high-impedance series resistor is formed through the series connection of two high-impedance series resistors. Thus, if one of the two resistors has a defect resulting in short circuit, the resulting sum resistance is still sufficiently high to ensure the function according to the invention.

Advantageously, it is provided that the low-impedance load resistor is fondled through a parallel connection of two low-impedance load resistors. In this case, too, the function according to the invention is further ensured in the case of failure of one of the two resistors.

Furthermore, a corresponding method is provided, in which a pulse signal applied to the driver module is switched through or inhibited depending on an inhibition signal by a switching element.

Advantageously, the device uses an electrical load, which is controlled by an inverter, for safe pulse inhibition.

Further advantageously, the electrical load is formed by an AC drive.

Other exemplary embodiments and advantages of the present invention may be ascertained by reviewing the present disclosure and the accompanying drawing.

BRIEF DESCRIPTION OF THE DRAWINGS

The subject of the invention will now be described in more detail with reference to FIGS. 1 to 6, which show exemplary, schematic and non-limiting advantageous embodiments of the invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
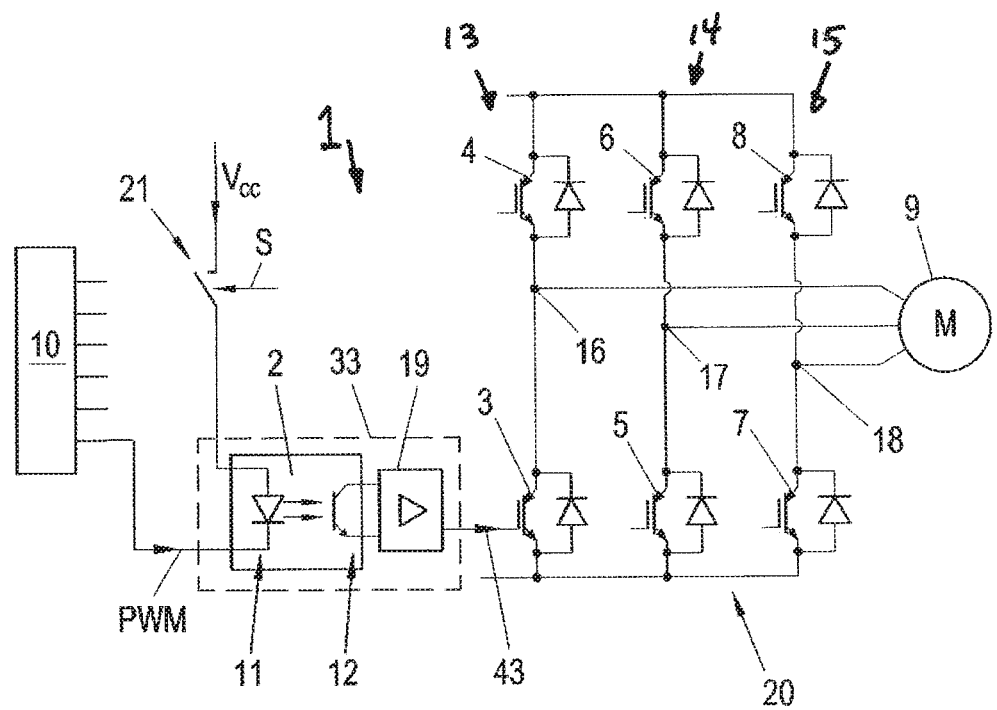
FIG. 1 shows a safe controlling of an electrical load on the form of a Safe Torque Off circuit according to the prior art.

FIG. 1 shows a safe controlling of an electrical load 9, in this case a three-phase motor, on the form of a typical Safe Torque Off circuit 1 according to the prior art.

Such a Safe Torque Off circuit, briefly STO circuit, is specified as a safety function, for instance by the Institute for Occupational Safety and Health.

As can be seen in FIG. 1, an optocoupler 2 is used to transmit a control signal 43 to an electrical load 9 or to the semiconductor switches 3 to 8 used for controlling. This optocoupler 2 is typically arranged in a driver module 33, commonly referred to as a gate driver. In a known manner, discrete or integrated circuits for controlling a semiconductor switch 3 to 8 are designated as the gate driver. The optocoupler thereby represents a galvanic isolation between a controller 10 and the semiconductor switches 3 to 8. The galvanic isolation need not necessarily occur via optocoupler 2, inductive, capacitive and other isolations are also possible. In cases where galvanic isolation is not required, this may be dispensed with entirely.

In principle, a separate driver module 33 is used for each semiconductor switch 3 to 8. FIG. 1 illustrates, however, purely schematically, only one of these driver modules 33.

The basis of the STO function according to the prior art is that a pulse signal PWM output from a controller 10 is passed to a driver module 33, however the driver module 33 is not supplied with energy if the STO function is activated, for example via an overriding control unit, not shown further. Various signal modulations may be used as a pulse signal PWM. Pulse width modulation, pulse duration modulation and pulse frequency modulation are mentioned non-limitingly and merely by way of example.

In the case of the arrangement according to the prior art shown in FIG. 1, the supply voltage Vcc of the driver module 33 is interrupted by a first switch 21. The first switch 21 is thereby interrupted by a pulse inhibition signal S if the STO function is activated, for example by an overriding control unit, not shown further. It should be noted that, for example, an active STO function or pulse inhibition means that the pulse inhibition signal STO is not provided. Because the secondary side 12 of the optocoupler 2 of the driver module 33 is connected with one of the semiconductor elements 3 to 8, the control signals 43 are not generated on the secondary side 12, due to the lack of supply voltage Vcc on the primary side 11 of the optocoupler 2.

Because the driver modules 33 are all supplied with the same supply voltage Vcc, all driver modules 33 may be interrupted with one pulse inhibition signal S and one switch 21.

As can further be seen in FIG. 1, an inverter 20 with a half bridge for each phase, here for example a first half bridge 13, a second half bridge 14 and a third half bridge 15 for an exemplary three-phase electrical load, is used for controlling the electrical load 9 in the known manner. Two semiconductor elements 3 to 8 are arranged in each of the half bridges 13, 14, 15, wherein the electric drive 9 is connected with a first node 16, a second node 17 and a third node 18, corresponding to the three phases. The three nodes 16, 17, 18 are arranged such that the first node 16 is between the two semiconductor elements 3 and 4, the second node 17 is between the two semiconductor elements 5 and 6 and the third node 18 is between the two semiconductor elements 7 and 8. As described above, each semiconductor element 3 to 8 is controlled here by a separate driver module 33. This basic circuit of an inverter is well known, for which reason it is not described in more detail here. A commonly provided pulse amplifier 19 for signal amplification is indicated in the driver module 33 in FIG. 1 only by way of example. Of course, the electrical load 9 and the inverter 20 may also be realized with any other number of phases.

Figure 2:
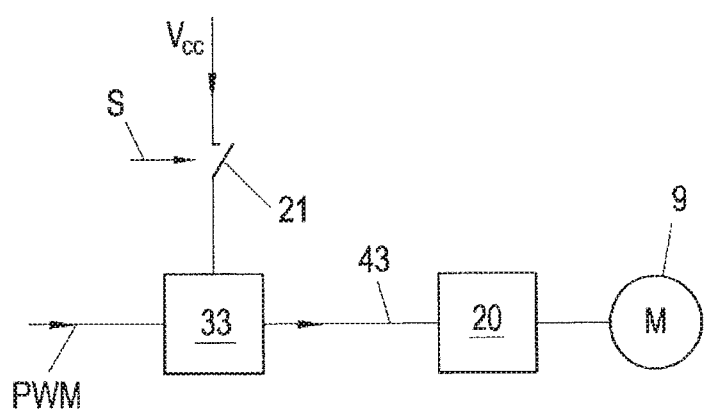
FIG. 2 shows a block diagram of a Safe Torque Off circuit according to the prior art.

FIG. 2 shows a simplified block diagram of a Safe Torque Off circuit 1 according to the prior art. This block diagram summarizes the—once again simplified—representation just described for FIG. 1.

With a non-activated STO, a driver module 33 for driving the circuit breaker and semiconductor elements 3 to 8 of an inverter 20 for an electrical load 9 are supplied with energy in the form of a supply voltage Vcc. Further, the driver module 33 is supplied with the pulse signal PWM in a known manner. In the course of a safe pulse inhibition or an activated STO function according to the prior art, the energy supply of the driver is interrupted.

Figure 3:
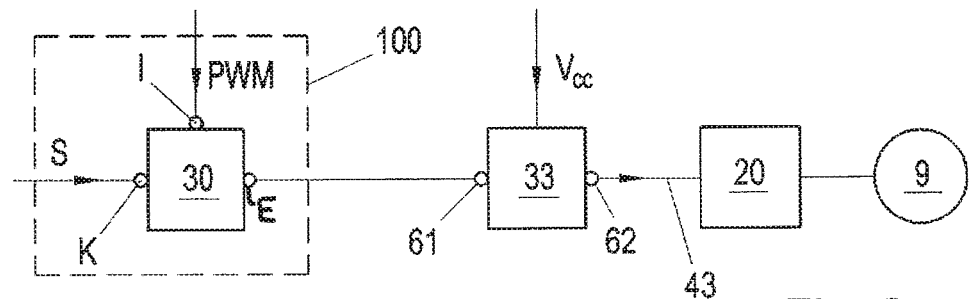
FIG. 3 shows a simplified block diagram of the device for safe control of a semiconductor switch of an inverter.

In contrast thereto, FIG. 3 shows a simplified block diagram of the device 100 according to the invention. As can be recognized schematically, an inverter 20 is provided, which supplies an electrical load 9 with AC voltage. Here, a driver module 33 is used, which controls a semiconductor switch of the inverter 20 depending on a pulse signal PWM. Furthermore, a switching arrangement 30 connected with the driver module 33 is provided, which has a switching connection K for applying an inhibition signal S and a first connection I for applying the pulse signal PWM, in order to either inhibit or switch the pulse signal PWM applied to the first connection I through to the driver module 33 at the output connection E, depending on the inhibition signal S. As can be seen, in contrast to the prior art, an interruption of the energy or supply voltage Vcc of the driver module 33 is not provided.

In this context, "inhibition" is understood as the interruption of a signal path to the driver module 33. If this signal path is not inhibited or interrupted, the pulse signal PWM is switched through to the driver module 33 or transmitted thereto, and the driver module 33 may output a control signal 43 to the inverter 20. The electrical load 9 may now be supplied with AC voltage. According to the invention, a switching arrangement 30 is thus used to directly interrupt the signal path of the pulse signal PWM to the driver module 33. In this manner, a previously mentioned safety function is realized.

As needed, the switching arrangement 30 is switched via the inhibition signal S, which is provided, for example, by an overriding control apparatus, not shown further.

Figure 4:
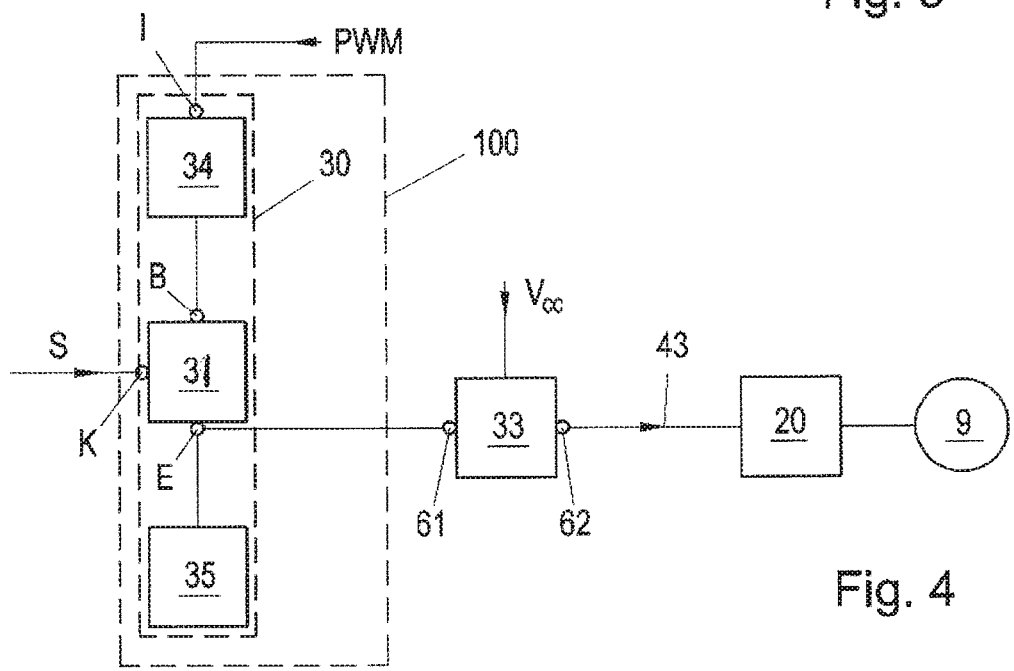
FIG. 4 shows the block diagram of an advantageous embodiment of the device according to the invention.

FIG. 4 shows the block diagram of an advantageous embodiment of the device 100 according to the invention.

Here, the switching arrangement 30 is formed by a series connection of a switching element 31, an upstream high-impedance series resistor 34 and a downstream low-impedance load resistor 35. The switching element 31 comprises the switching connection K, the output connection E of the switching arrangement 30 and the input connection B. The high-impedance series resistor 34 has the first connection I. A second connection of the high-impedance series resistor 34 is connected with the input connection B of the switching element 31. The output connection E of the switching element 31 is connected with the low-impedance load resistor 35. The driver module 33 has a driver input 61, which is connected with the output connection E of the switching element 31. For outputting a control signal 43, the driver module 33 further comprises a control output 62, which is connected with the semiconductor switch of the inverter 20.

Figure 5:
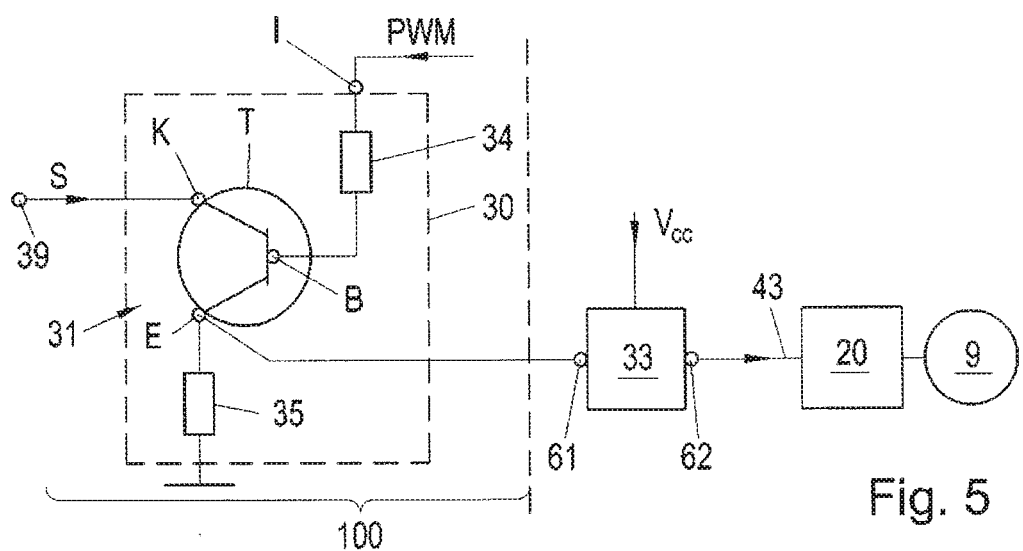
FIG. 5 shows a further advantageous embodiment of the device according to the invention.

FIG. 5 shows a further advantageous embodiment, in which the switching element 31 is designed as a transistor T in a common collector and that the input connection B is formed as the base thereof, the switching connection K is formed as the collector thereof and the output connection E is formed as the emitter thereof. Transistors represent cost-effective components, have short switching times, are maintenance-free, space-saving and have a long service life. Nevertheless, the use of an appropriate logic gate as a switching element 31 instead of the transistor T would also be conceivable. Other transistor circuits may also possibly be used. However, reference is made hereinafter to the particularly advantageous embodiment variant using a transistor T in a common collector (also referred to as an emitter follower).

In the collector circuit of a transistor T, a current which reduced by current gain in a known manner flows at the input connection B (here the base of the transistor T) than that which flows at the output connection E (here the emitter of the transistor T). The high-impedance series resistor 34 connected with the input connection B thereby causes a negligible voltage drop, and a voltage gain of approximately one results. However, current gain only occurs if a voltage is applied between the switching connection K (here the collector of the transistor T) and the output connection E.

If the switching connection K is thus supplied with voltage due to the inhibition signal S applied to an input terminal 39, a current gain results and the pulse signal PWM, which is applied to the input connection or the base of the transistor T, is switched through almost unchanged to the output connection E. This is different if the switching connection K is not supplied, i.e. if voltage is not applied to the input terminal 39. The transistor T then has no gain action. In this case, the pulse signal PWM is attenuated significantly according to the voltage divider rule, wherein the voltage divider is formed by the high-impedance series resistor 34 and the low-impedance load resistor 35. The voltage drop across the low-impedance load resistor 35 is too low to control the drive module 33. Contrary to FIG. 5 and the subsequently-described FIG. 6, additional switches or components such as MOSFET transistors may be inserted between the output connection E and the driver module 33, without altering the inventive concept.

Fail-safe resistors (also proven in use) are used for the high-impedance series resistors 34 and/or low-impedance load resistors 35. Furthermore, the high-impedance series resistor 34 is formed by a series connection of two high-impedance series resistors 34. Analogously, the low-impedance load resistor 35 is formed by a parallel connection of two low-impedance load resistors 35. The resistance ratio is selected such that even in total failure of a high-impedance series resistor 34 and/or low-impedance load resistor 35, the required voltage attenuation is ensured. Otherwise, a voltage drop may also occur without current gain through the transistor T of such size that the driver module 33 may be activated. In order to ensure that the driver module 33 certainly cannot be controlled if the STO function is activated, the high-impedance series resistor 34 may never be low-impedance, and the load resistor 35 may never be high-impedance. As high- and low-impedance is to be understood that the low-resistance load resistor 35 has a lower electrical resistance than the high-impedance series resistor 34.

It is therefore apparent that the necessary control signal 43 for controlling a semiconductor switch 3 can be made available from the driver module 33 only if an inhibition signal S, in particular in the form of an electrical voltage, is applied to the switching connection K of the transistor T. Thus, if the inhibition signal S is not provided or is interrupted, the electrical load 9 is not controlled in this manner, as the pulse signal PWM is not switched through.

A measure is thereby taken by which, in the context of safety classifications in automation technology, the device 100 may be referred to as "safe." This means that a controlling of the driver module 33 is inhibited with corresponding probability if the STO function is activated.

In order to increase the safety of the already-described device 100 still further, it may be provided that the inhibition signal S is not applied directly to the switching connection K of the switching element 31 or to the collector of the transistor T. As shown schematically in FIG. 6, the inhibition signal S may be executed before the switching element 31 via a ballast circuit 101.

Figure 6:
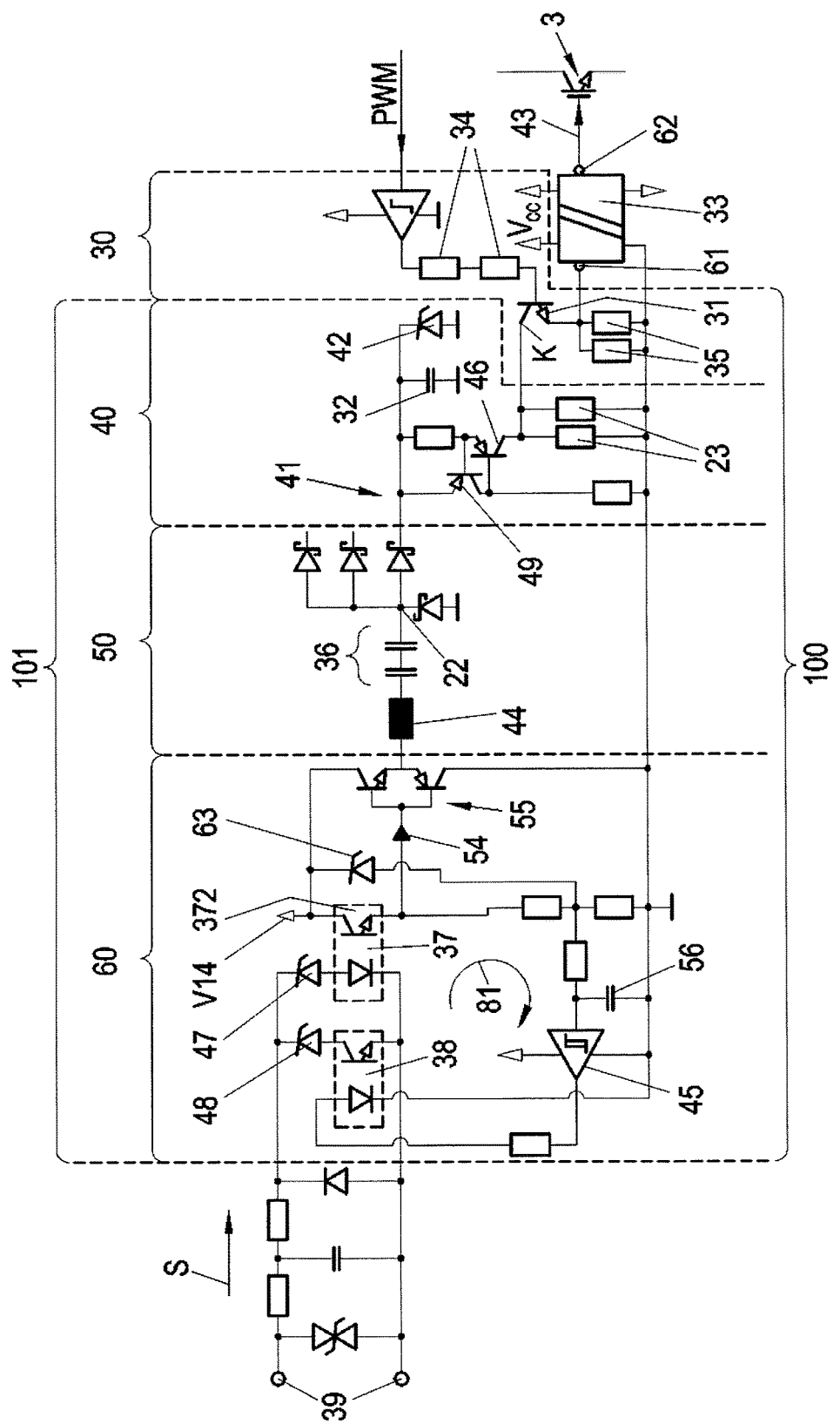
FIG. 6 shows a circuit diagram of the device according to the invention in a particularly advantageous embodiment.

As shown in FIG. 6, the device 100 is divided into four functional units:

30) switching arrangement, 40) storage capacitor and current source as part of the ballast circuit 101, 50) charging apparatus, also as part of the ballast circuit 101, 60) optical coupling, likewise as part of the ballast circuit 101.

The ballast circuit 101, or its three associated functional units, current source 40, charging apparatus 50 and optical coupling 60, are described with reference to FIG. 6, which shows a circuit diagram of the device 100 according to the invention in a particularly advantageous embodiment.

It should be noted that a variant of the ballast circuit 101 is conceivable which only includes the current source 40.

If the device 100 is used for a three-phase power supply network, the circuit may divided, for example at the node 22, into a plurality of equal parts, for example into three for the three phases or the three-phase power supply network. A division into six equal parts in consideration of high-side and low-side semiconductor switches is also conceivable.

With reference to the inverter shown in FIG. 1, it is to be noted that the semiconductor components 4, 6 and 8 above the nodes 16, 17 and 18 are designated in the known manner as high-side semiconductor components due to their position in the circuit, and the semiconductor components 3, 5 and 7 are designated as low-side circuit components. The device 100 can of course also be used in connection with inverters comprising a different structure as that mentioned above.

The functional units of the storage capacitor and current source 40, shown in FIG. 6 to the right of node 22, as well as the switching assembly 30, may in this case be formed equally and in the same manner for each of the three phases or for each switching element 31, as also indicated in FIG. 6.

If the inhibition signal S is provided by an overriding control unit, not shown further, periodic, brief voltage drops, referred to as test gaps, with a duration for example of 60-400 µs may occur in the inhibition signal S. These stem from an ordinary self-test for safety-related control devices. The overriding control unit, not shown further, checks its own functionality by these test gaps. However, since the interruption of the inhibition signal S is used only for testing purposes and does not correspond to the activation of the safety function, the device 100 must continue to control the semiconductor switch 3 during the test gaps and must continue to supply the electrical load 9 with AC voltage.

For this case, it may be provided that a ballast circuit 101 is switched ahead of the switching arrangement 30. The ballast circuit 101 includes a storage capacitor 32 with a charging apparatus 50 and a discharging device 41. The charging apparatus 50 is connected with the storage capacitor 32. Furthermore, the storage capacitor 32 is connected with the discharging device 41 and the switching connection K of the switching arrangement 30.

The storage capacitor 32 is continuously charged by the charging apparatus 50, consisting of at least one transfer capacitor 36. This ensures a certain state of charge of the storage capacitor 32, so that the aforementioned test gaps can be bridged. In principle, the storage capacitor 32 continues to provide the switching arrangement 30 with energy via the switching connection K during the test gaps. In its dimensioning, the storage capacitor 32 is preferably designed such that it is just possible to bridge a test gap of the mentioned temporal duration and to supply the switching element 31 with current during the test gap.

The discharging device 41 ensures that the storage capacitor 32 is discharged via at least one base load resistor 23 continuously and in a foreseeable time. The discharging device 41 is connected with the switching element 31 and simultaneously represents a current source in combination with the storage capacitor 32, via which the switching element 31 and the transistor T is supplied with current. The discharging device 41 is advantageously a constant current source which, as can be seen in FIG. 6, may be constructed in a known manner from a first control transistor 46 and a second control transistor 49 connected therewith.

Via the continuous discharge of the storage capacitor 32, in the case of a triggering of a safety function, this may supply the switching element 31 or the transistor T only so long as is necessary for the bridging of test gaps.

In the case of triggering of the safety function, the storage capacitor 32 is discharged for the foreseeable time, not only through current emission to the switching element 31, but also via the discharging device 41. The switching element provides current here only during this foreseeable time. A time delay is thereby minimized, and a substantially faster triggering of the safety function is enabled than without a continuous discharge of the storage capacitor 32 via a discharging device 41.

As shown in FIG. 6, a Zener diode 42 is arranged parallel to the storage capacitor 32. This ensures only that, with a voltage level which is possibly too high, the storage capacitor 32 is not charged higher than is allowed by the breakdown voltage of the Zener diode 42. The storage capacitor 32 can thus be maintained at a defined voltage.

At the same time, the storage capacitor 32 is charged continuously by the charging apparatus 50 switched upstream if an inhibition signal S is provided, which will be described together with the function block of the optical coupling 60.

In order to increase safety, the storage capacitor 32 is supplied without galvanic connection to the input terminal 39, to which the inhibition signal S is applied. A conventional input protection may be provided at the input of the device 100. This protects the subsequent components in a known manner from overvoltage, reverse polarity, etc. Such a device is generally well known in control technology, for which reason this circuit part is not described in further detail.

The galvanic isolation is carried out within the optical coupling 60 by a first optocoupler 37. In order to ensure in the event of an optocoupler defect that no energy is transferred to the storage capacitor 32, the energy transfer occurs capacitively via the charging apparatus 50. It should be noted that, in the case of a defect, it is possible that the first optocoupler 37 forms a continuous coupling. Here, a constant voltage level is applied to the output 372 of the optocoupler 37. However, as the subsequent charging apparatus 50 consists of at least one transfer capacitor 36 and this may, as is well known, transfer only one AC voltage, the storage capacitor 32 is not charged.

The inhibition signal S, however, is formed by a DC voltage factor. In order to prepare this so that it may be transferred via the charging apparatus 50, it is provided that, in the ballast circuit 101, the optical coupling 60 is made dynamic for converting the inhibition signal S into an AC voltage. The AC voltage is then transmitted to the charging apparatus 50, which is connected to the optical coupling 60. In order to generate the already-mentioned necessary AC voltage for energy transfer to the charging apparatus 50, the device 100 is made dynamic within its ballast circuit 101 or the optical coupling 60. This occurs through a feedback loop 81 integrated into the optical coupling 60, consisting of at least a hysteresis comparator 45, a delay element 56 and a second optocoupler 38.

The starting point for the dynamization is that the inhibition signal S is applied to the first optocoupler 37 in the form of a DC voltage and activates this. As can be seen from FIG. 6, the secondary side 372 of the first optocoupler 37 is connected to the hysteresis comparator 45 via a delay element 56. The delay element 56 comprises a capacitor, designated hereinafter as a dynamization capacitor. Upon activation of the first optocoupler 37, the dynamization capacitor is charged, subsequently the hysteresis comparator 45 transfers a high-signal to the second optocoupler 38 upon reaching its upper switching threshold. The second optocoupler 38 is thereby activated, and the inhibition signal S is short-circuited. As a result, the first optocoupler 37 is deactivated. The dynamization capacitor is now discharged until the hysteresis comparator 45 reaches its lower switching threshold, whereby a high-signal is no longer transferred to the second optocoupler 38. This is therefore in turn deactivated, the inhibition signal is again applied to the first optocoupler 37 and supplies this once more.

Due to this dynamically changing operation, an AC voltage is generated at the output 372 of the optocoupler 37.

In a component failure within the feedback loop 81, in the worst case a constant voltage is present at the transfer capacitor 36 of the charging apparatus 50. As already stated, there is inevitably no energy transfer via the transfer capacitor 36 in this case.

As can be seen in FIG. 6, a driver stage 55 is provided between the optical coupler 60 and the charging apparatus 50, which driver stage 55 correspondingly amplifies the output signal 54 of the optical coupler 60 in a known manner such that a sufficient amount of energy is provided to the charging apparatus 50 for further transmission.

In the subsequent charging apparatus 50, it may of course be provided to increase safety that the already-mentioned transfer capacitor 36 is formed by a series connection of a plurality of transfer capacitors 36. Should one of the transfer capacitors 36 be defective and cause a short circuit, this nevertheless does not lead in the case of a continuously conductive optocoupler to an energy transfer, due to a further transfer capacitor 36. In FIG. 6, two transfer capacitors 36 are connected in series by way of example. The inductor 44 of the charging apparatus 50 which is further switched in series with the transfer capacitor 36 is advantageous but is not absolutely essential. It serves primarily for increasing voltage and avoiding charging current peaks. The bandpass characteristic is also advantageous, i.e. the inhibition of frequencies outside a desired passband, through the combination of inductor and transfer capacitor.

The first Zener diode 47 provided in the optical coupling 60 in the area of the first optocoupler 37 ensures that the switch-on threshold is at least as high as is prescribed for control inputs in relevant standards. The first optocoupler 37 can be activated only when the breakdown voltage, typically in the range of five volts, of the first Zener diode 47 is reached. The further, appropriately-sized second Zener diode 48 in the area of the second optocoupler 38 ensures that, in case of a failure or short-circuit of the first Zener diode 47, the already-described dynamization is not possible. In the case of a short-circuit or a breakdown voltage of the first Zener diode 47 which is too low, the first optocoupler 37 cannot be inhibited by the second optocoupler 38. In this case, the first optocoupler 37 would be constantly active with an inhibition signal S pending at the terminal 39, which corresponds to a DC voltage. This would not be a "dangerous" condition, as the driver module 33 is to be controlled in any case with the applied inhibition signal S, however the aforementioned dynamization is lacking. An energy transfer via the subsequent charging apparatus 50 therefore cannot occur. Such an error in the optical coupling 60 is thus immediately recognizable, because the driver module 33 is not further controlled, although the inhibition signal S is not interrupted.

The third Zener diode 63, shown in FIG. 6 in the area of the optical coupling 60, is used for safety with respect to an overvoltage of the electrical supply voltage V14. In the event of an overvoltage, the Zener diode 63 is conductive and as a result emits a high signal to the aforementioned hysteresis comparator 45. No AC voltage is thereby generated by the optical coupling 60 which could be transmitted via the charging apparatus 50.

As an alternative to the previously illustrated galvanic isolation in the optical coupling 60 via the optocouplers 37 and 38, an inductive form of energy transfer via a transformer and upstream chopper is also possible.

If the safety function is requested, for example by the overruling control unit, not shown further, no voltage is applied to the input terminal 39. Subsequently, the storage capacitor 32 is no longer charged, as the optical coupling 60 generates no AC voltage and no energy is transported via the charging apparatus 50. If at this time no control signals 43 are output and therefore the switching arrangement 30 is not receiving current, the discharging device 40 must discharge the electrical energy stored in the storage capacitor 32 in another way. This may occur, for example, via a Zener diode parallel to the switching arrangement 30 or, as shown in FIG. 6, via a base load resistor 23. In that the storage capacitor 32 is, as previously described, discharged continuously and in any case, it is ensured that the discharging occurs in a foreseeable time.

Advantageously, the device 100 uses an electrical load, which is controlled by an inverter 20, for safe pulse inhibition. Here, the electrical load 9 is advantageously formed by an AC drive.

AC drives are understood to here to include conventional electric drives such as AC motors, three-phase motors and the like. Here, due to the operations described above, the AC drive is no longer supplied with AC voltage if the inhibition signal S is not applied to the input terminal 39. In this way, a pulse inhibition results and the AC drive is switched free of torque. The already-mentioned Safe Torque Off function is realized in this way for an AC drive by the device 100.

This is true in an analogous manner if the electrical load 9 is formed by a linear motor, wherein as a result of the pulse inhibition, force can no longer be exerted by the linear motor.

By way of the device 100 as described above and illustrated in the FIGS. 3 to 6 for an electrical load 9 or an electrical drive, the safety is correspondingly increased with respect to the current prior art due to a substantially decreased reaction time of the circuit.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for safe control of at least one driver module for controlling a semiconductor switch of an inverter, wherein the driver module controls the semiconductor switch in dependence on a pulse signal, the device comprising:
    a switching arrangement, which is connected with the driver module, has a switching connection for applying an inhibition signal and a first connection for applying the pulse signal, in order to either inhibit or switch the pulse signal applied to the first connection through to the driver module, depending on the inhibition signal, wherein the switching arrangement is formed by a series connection of a switching element with the switching connection, an upstream high-impedance series resistor, preferably formed by the series connection of two high-impedance series resistors, with the first connection and a downstream low-impedance load resistor, preferably formed by a parallel connection of two low-impedance load resistors, a second connection of the high-impedance series resistor is connected with an input connection of the switching element and an output connection of the switching element is connected with the low-impedance load resistor.

2. A device for safe control of at least one driver module for controlling a semiconductor switch of an inverter, wherein the driver module controls the semiconductor switch in dependence on a pulse signal, the device comprising:
    a switching arrangement, which is connected with the driver module, has a switching connection for applying an inhibition signal and a first connection for applying the pulse signal, in order to either inhibit or switch the pulse signal applied to the first connection through to the driver module, depending on the inhibition signal, wherein the switching element is designed as a transistor in a common collector and that the input connection is formed as the base thereof, the switching connection is formed as the collector thereof and the output connection is formed as the emitter thereof.

3. A device for safe control of at least one driver module for controlling a semiconductor switch of an inverter, wherein the driver module controls the semiconductor switch in dependence on a pulse signal, the device comprising:
    a switching arrangement, which is connected with the driver module, has a switching connection for applying an inhibition signal and a first connection for applying the pulse signal, in order to either inhibit or switch the pulse signal applied to the first connection through to the driver module, depending on the inhibition signal, wherein a ballast circuit is switched ahead of the switching arrangement, the ballast circuit includes a storage capacitor with a charging apparatus and a discharging device, the charging apparatus is connected with the storage capacitor and the storage capacitor is connected with the discharging device and the switching connection of the switching arrangement.

4. The device according to claim 3, wherein the charging apparatus consists of at least one transfer capacitor.

5. The device according to claim 3, wherein the ballast circuit includes a dynamized optical coupling for converting the inhibition signal to an AC voltage, which is connected to the charging apparatus for transmitting the AC voltage.

6. The device according to claim 5, wherein the optical coupling includes a feedback loop which is formed at least from a hysteresis comparator, a delay element and a second optocoupler.

7. The apparatus according to claim 3, wherein the discharging device is connected with the switching element for supplying the switching element with current.

8. A method for safe control of a semiconductor switch of an inverter that supplies an electrical load with AC voltage, wherein a driver module controls the semiconductor switch in dependence on a pulse signal, the method comprising:
    the pulse signal applied to the driver module is switched through or inhibited depending on an inhibition signal by a switching element,
    wherein the switching element is supplied with current by a discharging device, in that a storage capacitor is continuously discharged by the discharging device via at least one base load resistor.

9. The method according to claim 8, wherein the storage capacitor is continuously charged by the charging apparatus, consisting of at least one transfer capacitor.

10. The method according to claim 9, wherein the charging apparatus is supplied with AC voltage by a dynamized optical coupling.

11. The method according to claim 10, wherein the inhibition signal applied to the optical coupling is made dynamic in the optical coupling by a first optocoupler and a feedback loop of at least one hysteresis comparator, a delay element and a second optocoupler.

12. A method of operating a device for safe pulse inhibition of an electrical load, which is controlled by an inverter, and includes a switching arrangement, which is connected to the driver module, having a switching connection for receiving an inhibition signal and a first connection for receiving the pulse signal, in which, depending upon the inhibition signal applied to the switching connection, the pulse signal applied to the first connection is one of passed or inhibited from being passed to the driver module, the method comprising:

receiving the inhibition signal at the switching connection of the switching arrangement, and receiving the pulse signal at the first connection of the switching arrangement; and depending upon the inhibition signal applied to the switching connection, one of passing or inhibiting from passing the pulse signal to the driver module.

13. The method according to claim 12, wherein the electrical load is formed as an AC drive.

* * * * *